(12) United States Patent
Lee et al.

(10) Patent No.: US 9,202,432 B2
(45) Date of Patent: Dec. 1, 2015

(54) WIDE VIEWING ANGLE HOLOGRAPHIC IMAGE DISPLAY METHOD AND APPARATUS

(71) Applicant: Electronics and Telecommunications Research Institute, Daejeon (KR)

(72) Inventors: Hoo-Sung Lee, Sejong (KR); June-Young Chang, Daejeon (KR); Seong-Su Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/259,746

(22) Filed: Apr. 23, 2014

(65) Prior Publication Data
US 2014/0347333 A1  Nov. 27, 2014

(30) Foreign Application Priority Data
May 27, 2013  (KR) .................. 10-2013-0059949

(51) Int. Cl.
*G09G 5/00*  (2006.01)

(52) U.S. Cl.
CPC ............ *G09G 5/00* (2013.01); *G09G 2320/028* (2013.01)

(58) Field of Classification Search
CPC . G09G 3/0033; G09G 3/2085; G09G 3/3688; G09G 2310/02; G09G 2320/028; G09G 5/00; G02B 27/22; G02B 27/2214; H04N 13/0404; H04N 13/0445; H04N 13/0497
See application file for complete search history.

(56) References Cited

U.S. PATENT DOCUMENTS

| | | | | |
|---|---|---|---|---|
| 4,717,949 A | * | 1/1988 | Eichenlaub | 348/54 |
| 5,999,281 A | * | 12/1999 | Abbott et al. | 359/15 |
| 7,753,529 B2 | * | 7/2010 | Fukaishi et al. | 353/7 |
| 8,823,634 B2 | * | 9/2014 | Suzuki et al. | 345/102 |
| 9,070,336 B2 | * | 6/2015 | Chiang et al. | 1/1 |
| 2004/0218245 A1 | | 11/2004 | Kean et al. | |
| 2005/0168815 A1 | * | 8/2005 | Maruyama et al. | 359/465 |
| 2010/0066654 A1 | * | 3/2010 | Huang et al. | 345/82 |
| 2011/0128555 A1 | * | 6/2011 | Rotschild et al. | 356/625 |
| 2012/0200795 A1 | * | 8/2012 | Takatori | 349/33 |
| 2012/0235986 A1 | * | 9/2012 | Ho et al. | 345/419 |
| 2012/0306935 A1 | * | 12/2012 | Jeong et al. | 345/690 |
| 2013/0215484 A1 | * | 8/2013 | Takaki et al. | 359/11 |
| 2013/0235019 A1 | * | 9/2013 | Kim et al. | 345/212 |
| 2013/0307831 A1 | * | 11/2013 | Robinson et al. | 345/207 |

FOREIGN PATENT DOCUMENTS

JP  2004287440 A  10/2004

OTHER PUBLICATIONS

Chris Slinger et al., "Computer-Generated Holography as a Generic Display Technology," Computer, Aug. 2005, pp. 46-53, vol. 38, No. 8, IEEE Computer Society.
R. Haussler et al., "Real-Time Holography," White Papers of the International 3D & Advanced Imaging Society, 2010, SeeReal Technologies GmbH.

* cited by examiner

*Primary Examiner* — Joe H Cheng
(74) *Attorney, Agent, or Firm* — William Park & Associates Ltd.

(57) ABSTRACT

A wide viewing angle holographic image display method and apparatus are disclosed. The wide viewing angle holographic image display apparatus includes a scan line unit and a control unit. The scan line unit includes a plurality of lateral scan lines that represent different angles, respectively. The control unit performs control so that different data are output at the respective different angles, represented by the lateral scan lines, using the plurality of lateral scan lines.

10 Claims, 9 Drawing Sheets

WIDE VIEWING ANGLE HOLOGRAPHIC IMAGE DISPLAY METHOD AND APPARATUS

CROSS REFERENCE TO RELATED APPLICATION

This application claims the benefit of Korean Patent Application No. 10-2013-0059949, filed on May 27, 2013, which is hereby incorporated by reference herein in its entirety.

BACKGROUND OF THE INVENTION

1. Technical Field

The present disclosure relates to a wide viewing angle holographic image display method and apparatus and, more particularly, to a large screen, wide viewing angle holographic image display method and apparatus that provide a wide viewing angle while maintaining the size of pixels that can be fabricated using current technology already commercialized.

2. Description of the Related Art

As "holo" of the term "hologram" implies "complete" and "gram" implies a "message" or "information," a hologram is a medium that records fringe patterns that reproduce a three-dimensional (3D) image using 3D photographs that appear to be an actual object. Most digital holographic image display apparatuses that have been currently researched use a spatial light modulator (SLM), and their viewing angle varies depending on the size of pixels. That is, a viewing angle increases in inverse proportion to the size of the pixels of a spatial light modulator. A reduction in the size of pixels is limited because of a limited spatial light modulator manufacturing process, thus resulting in a limitation being imposed on viewing angles that can be provided by current digital holographic display apparatuses.

The principle of a holographic image display will be described below.

FIGS. 1 and 2 are diagrams illustrating the principle of a holographic image display.

Referring to FIGS. 1 and 2, for example, in order to provide a viewing angle of about 5 degrees, a spatial light modulator that provides a pixel interval of about 3.5 um is required. Meanwhile, in order to provide a viewing angle in the range of 40 to 60 degrees, which does not cause inconvenience while viewing an image, a spatial light modulator having the size of pixels equal to or smaller than 1 um is required. However, it is impossible to fabricate a spatial light modulator having such a micro-size using current technology.

Japanese Unexamined Patent Publication No. 2004-287440 discloses a configuration for increasing a viewing angle by adjusting the size of the pixels of a light modulator. However, the decreasing of the size of pixels to such a size cannot be accomplished by current technology.

Furthermore, as a method of increasing the viewing angle of a digital holographic display apparatus while overcoming the limitations of a spatial light modulator, a method of finding the location of the eye and generating a virtual window using eye tracking so that a normal image is formed when viewed from the location of the eye is being proposed and researched.

However, this technology is problematic in that it is difficult to find the accurate location of the eye and also it is difficult for multiple people to view a holographic image at the same time using this technology.

Furthermore, in order to enable multiple people to view a holographic image, research is being conducted into a method of increasing the frame rate of a narrow viewing angle holographic display apparatus and generating virtual windows at different locations using a temporal multiplexing method.

However, this technology is limited in an increase in the frame rate of a holographic display apparatus, and thus it is still difficult to increase a viewing angle.

SUMMARY OF THE INVENTION

Accordingly, the present invention has been made keeping in mind the above problems occurring in the conventional art, and an object of the present invention is to provide a wide viewing angle holographic image display method and apparatus that are capable of displaying wide viewing angle holographic images without reducing the size of pixels.

Another object of the present invention is to provide a wide viewing angle holographic image display method and apparatus that are capable of dividing a space in a lateral direction of pixels and then supporting a wide viewing angle.

Still another object of the present invention is to provide a wide viewing angle holographic image display method and apparatus that are capable of performing control so that holographic images having different angles are displayed along the respective lateral scan lines of pixels.

In accordance with an aspect of the present invention, there is provided a wide viewing angle holographic image display method, including selecting a plurality of lateral scan lines that represent different angles, respectively; and performing control so that different data are output at the respective different angles, represented by the lateral scan lines, using the plurality of lateral scan lines.

The plurality of lateral scan lines may be present in adjacent pixels.

The adjacent pixels may be configured to have the same size.

Selecting the lateral scan lines may include selecting an odd number of lateral scan lines.

The upper and lower lateral scan lines of the plurality of lateral scan lines may represent symmetrical angels with respect to a center lateral scan line in a vertical direction.

In accordance with another aspect of the present invention, there is provided a wide viewing angle holographic image display apparatus, including a scan line unit configured to include a plurality of lateral scan lines that represent different angles, respectively; and a control unit configured to perform control so that different data are output at the respective different angles, represented by the lateral scan lines, using the plurality of lateral scan lines.

The plurality of lateral scan lines may be present in adjacent pixels.

The adjacent pixels may be configured to have the same size.

Selecting the lateral scan lines may include selecting an odd number of lateral scan lines.

The upper and lower lateral scan lines of the plurality of lateral scan lines may represent symmetrical angels with respect to a center lateral scan line in a vertical direction.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
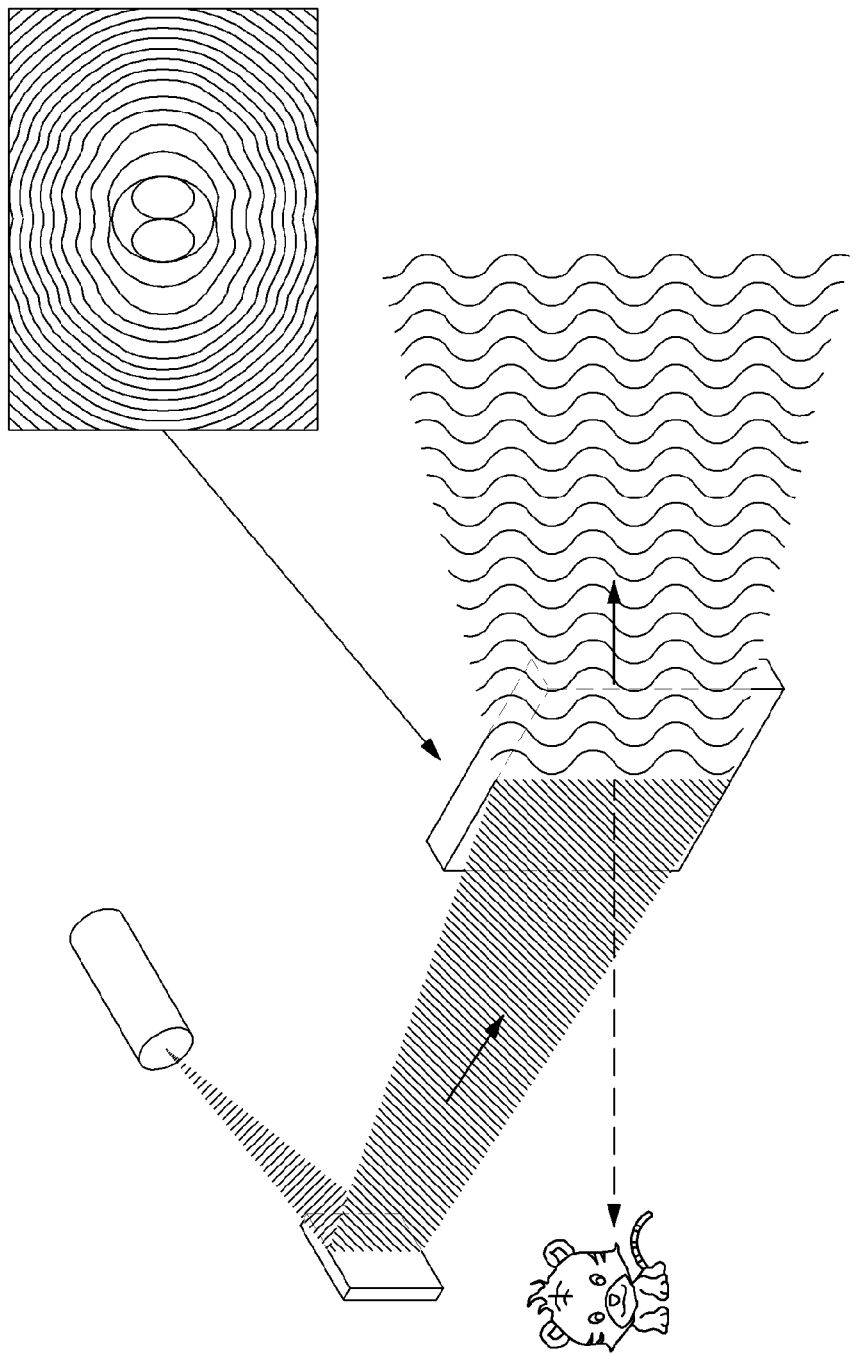
FIGS. 1 and 2 are diagrams illustrating the principle of a holographic image display.
Figure 2:
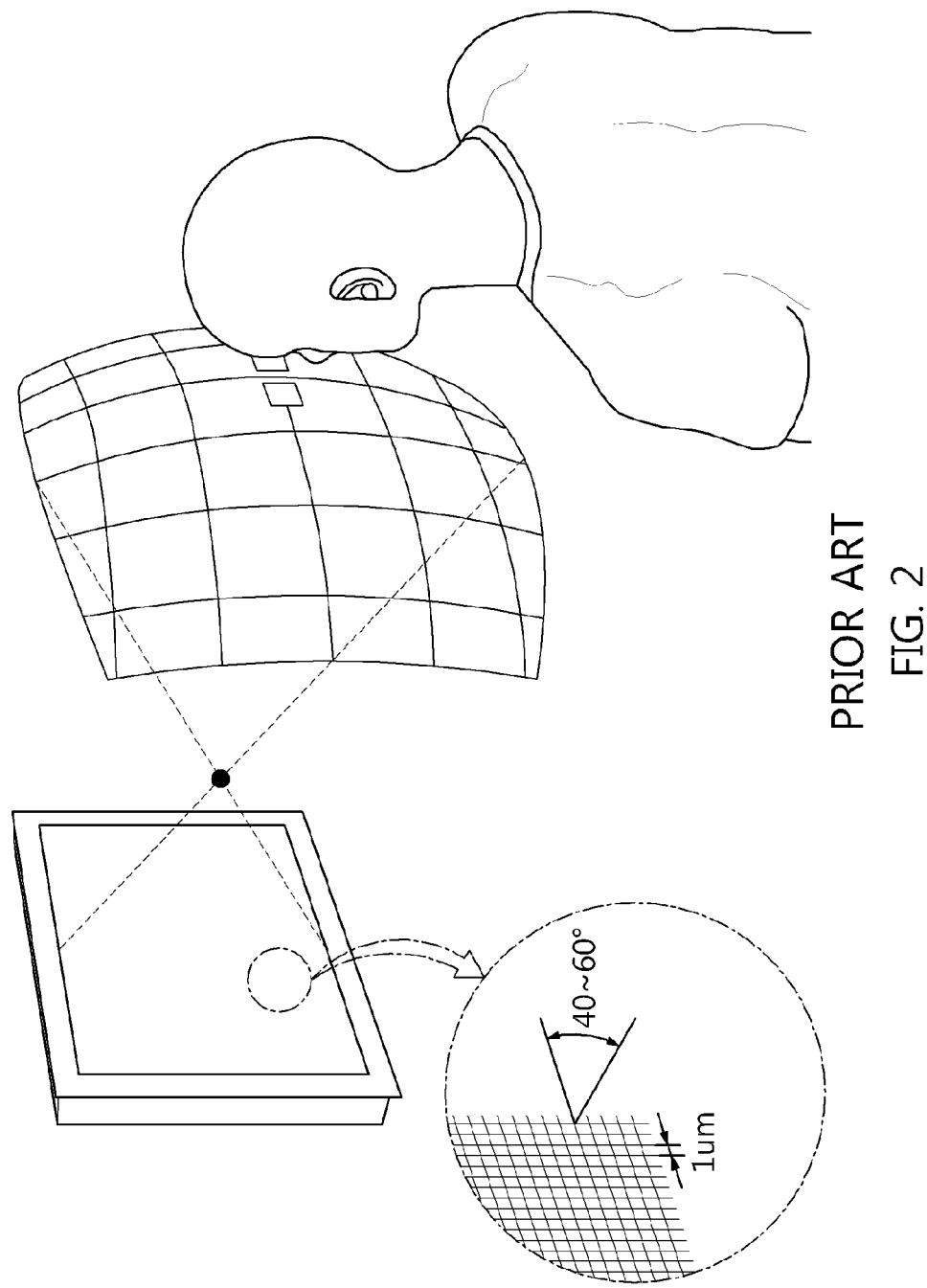

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Digital holography that has recently attracting attention as next generation display technology and foundation technologies that support digital holography will be described below. Holography records and reproduces an image of an object using a silver salt film.

The hologram film used in this case is different from a general photographic film only in that the sampling rate thereof is sufficiently high to record the details of an object.

The reason why an ordinary photograph cannot reproduce an object in 3D form is that the ordinary photograph records only the brightness and darkness features of an object but cannot record locations of the object, that is, the distances from a human's eye to various portions of the object.

If the extents of the brightness and darkness of an object are represented by the amplitudes of light waves, the locations of the object may be represented by the phases of the light waves. A complete 3D image can be reproduced only if all the amplitudes and the phases can be recorded.

While an ordinary photograph records an image on a film by focusing the image on the film by means of a camera lens using light having low coherence, such as natural light or the light of an indoor lamp, such as a fluorescent lamp, a hologram records an object on a film using an optical principle called interference. Accordingly, to create a hologram, light having high interference, such as a laser beam, is used.

A photographic film on which an image of an object has been recorded in the form of a fringe pattern is referred to as a hologram, and a technique for recording a hologram and reconstructing a 3D image is referred to as holography. The information of an object contained in interference fringes recorded in a hologram is reproduced as a 3D image in an actual space using an optical principle called diffraction.

Recently, basic research into digital holography-based 3DTV is being conducted by MIT of the U.S., NHK and ATR of Japan, and HHI of Germany. Since a holography method is the most promising 3D technology, research into optical holography and digital holography-based 3DTV systems are being actively conducted. The following wide viewing angle holographic image display method and apparatus according to embodiments of the present invention are based on a digital holography method.

Figure 3:
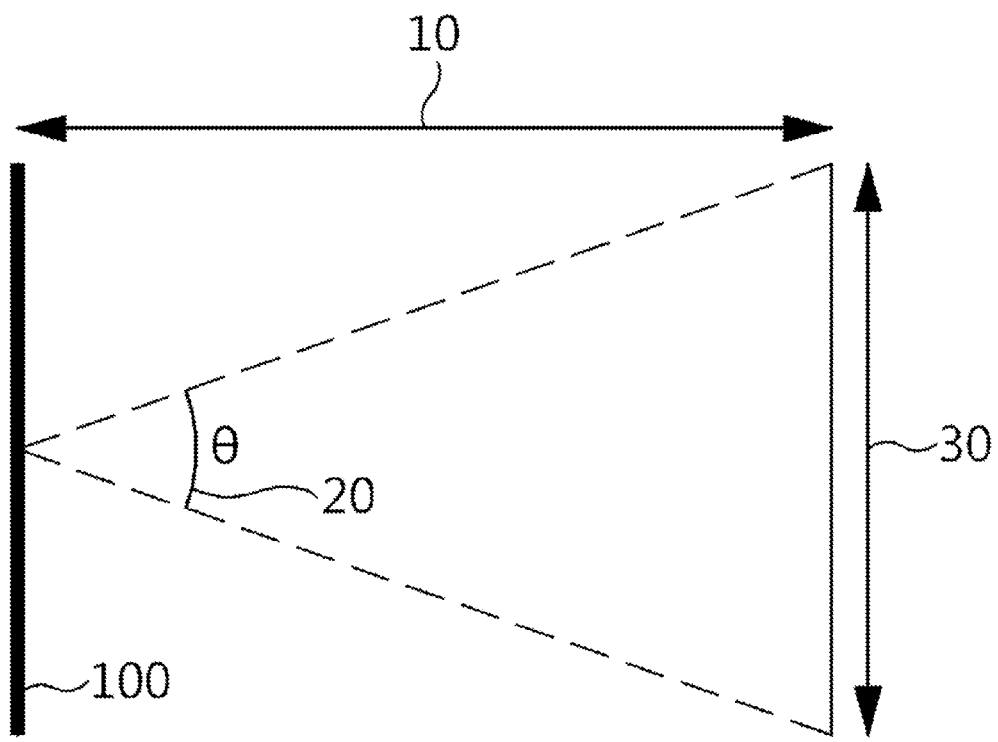
FIG. 3 is a diagram illustrating the viewing angle of a holographic image display.

FIG. 3 is a diagram illustrating the viewing angle of a holographic image display.

Referring to FIG. 3, the relationships between the wide viewing angle holographic image display apparatus 100 according to the present invention, a viewing distance 10, a viewing angle 20, and a viewing range 30 can be seen. More specifically, it can be seen that the size p of pixels varies depending on the viewing angle 20 and the viewing angle increases in inverse proportion to the size of the pixels of the holographic image display apparatus 100, as described in Equation 1, where λ is the wavelength of light:

$$\text{Pixel Size}(p) = \frac{\lambda}{2\sin(\theta)} \quad (1)$$

Spatial light modulators, which are core devices of digital holographic display apparatuses, are limited in a reduction in the size of pixels because they use a microprocess. Of spatial light modulators fabricated using current technology, a 1 to 2-inch small-sized spatial light modulator for a projector can be fabricated such that the intervals between pixels are equal to or smaller than 10 um, but is expensive. A 4 to 5-inch spatial light modulator for a mobile display, which can be currently commercialized, has a pixel interval of about 70 um.

A retina display for an iPhone 4 smartphone, which currently has the narrowest pixel interval, has 326 pixels per inch. If this is converted into a pixel size, 78 um per pixel is obtained. Since three sub-pixels form a single pixel so as to achieve color display, the size of the sub-pixels is 78 um in width and 26 um in height.

When a hologram is displayed using the retina display for an iPhone 4 smartphone, a holographic image whose viewing angle in width is about 0.6 degrees and whose viewing angle in height is about 0.2 degrees may be formed based on the above equation. When a display for research into holographic display, whose pixel interval is equal to or narrower than 10 um, is used, a holographic image having a viewing angle of about 2 degrees is formed, but is problematic in that it is difficult to observe a hologram image because the viewing angle is narrow.

In general, holographic image display apparatuses aim to support parallax that allows an actual 3D object to appear to be viewed from all directions including lateral and vertical directions.

However, most applications have no difficulty achieving their purposes as long as only lateral parallax using a human's binocular disparity can be supported.

In order to support parallax in all directions including lateral and vertical directions, the size of pixels should be equal to or smaller than 1 um in width and length. In contrast, when only lateral parallax is supported and vertical parallax is abandoned, the size of pixels should be equal to or smaller than 1 um and the lengthwise size can be that of an existing display.

Figure 4:
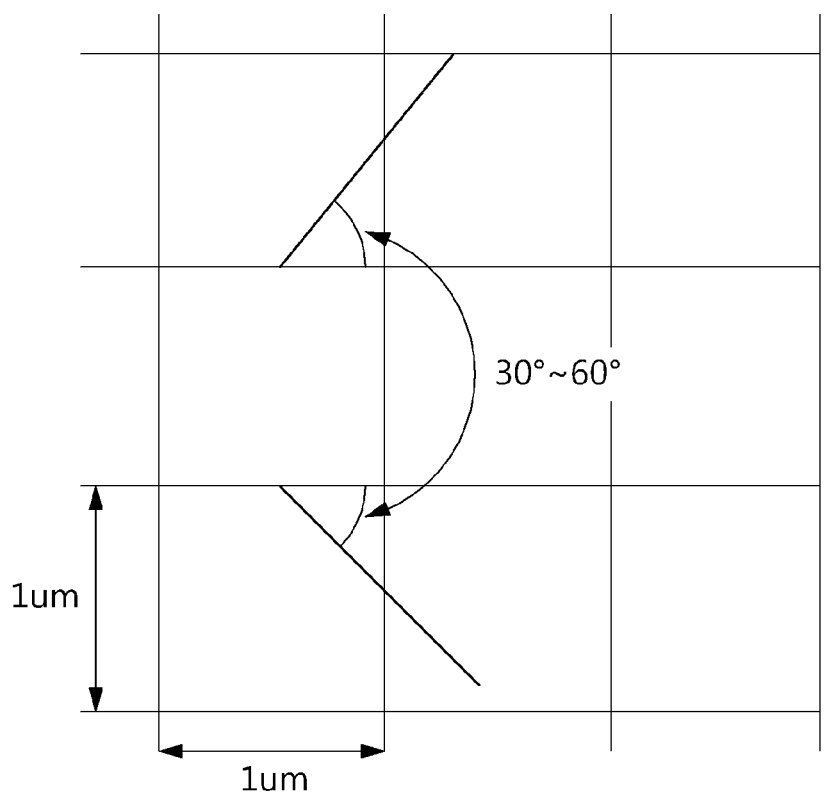
FIG. 4 is a diagram of an ideal holographic image display apparatus.

FIG. 4 is a diagram of an ideal holographic image display apparatus.

Referring to FIG. 4, in the ideal holographic image display apparatus, a viewing angle in the range of 30 to 60 degrees can be provided only if the size of pixels is equal to or smaller than 1 um. That is, the size of pixels is 1 um in both width and height, and thus a viewing angle in the range of 30 to 60 degrees can be ensured. However, this cannot be implemented by current technology.

Figure 5:
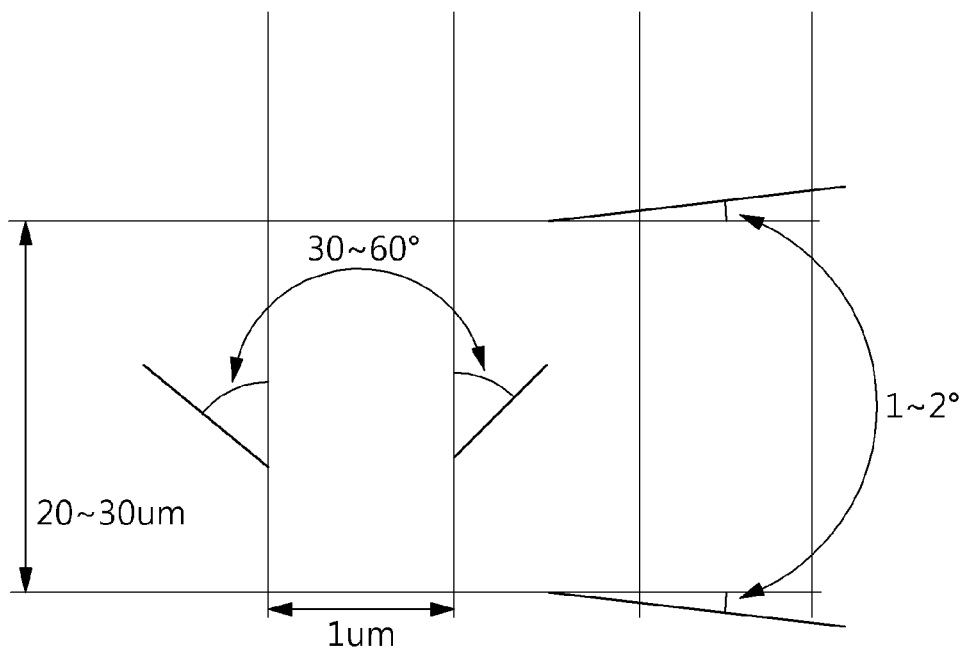
FIG. 5 is a diagram a holographic image display apparatus from which vertical parallax has been removed.

FIG. 5 is a diagram a holographic image display apparatus from which vertical parallax has been removed.

Referring to FIG. 5, if support for vertical parallax is abandoned, the size of pixels that is required to display a holographic image is reduced to 1 um or less in width, and is increased to 20 to 30 um in height, which can be currently implemented, as illustrated in FIG. 5.

In general, holographic image display apparatuses aim to support parallax that allows an actual 3D object to appear to be viewed from all directions including lateral and vertical directions.

However, most applications have no difficulty achieving their purposes as long as only lateral parallax using a human's binocular disparity can be supported. Accordingly, even when support for vertical parallax is abandoned, as illustrated in FIG. 5, the purposes of the applications can be achieved.

A wide viewing angle holographic image display method according to an embodiment of the present invention will now be described.

Figure 6:
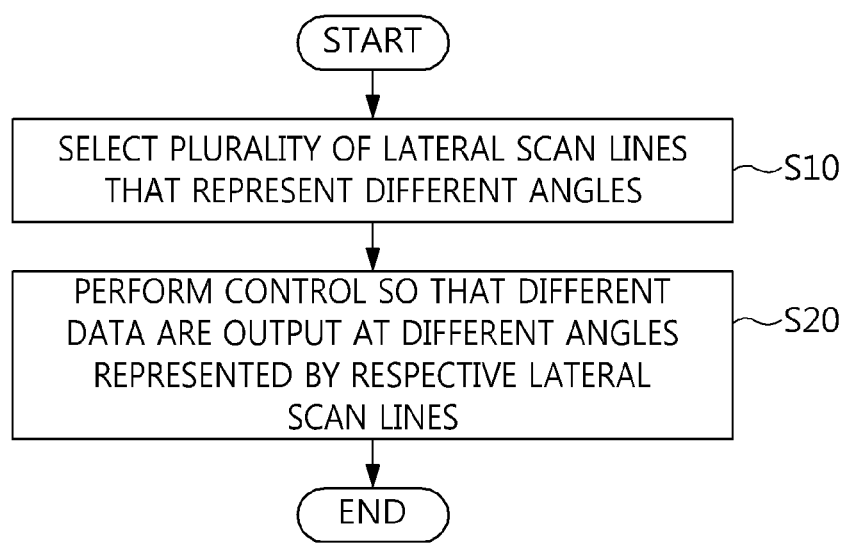
FIG. 6 is a flowchart of a wide viewing angle holographic image display method according to an embodiment of the present invention.

FIG. 6 is a flowchart of the wide viewing angle holographic image display method according to this embodiment of the present invention.

Referring to FIG. 6, the wide viewing angle holographic image display method according to this embodiment of the present invention includes step S10 of selecting a plurality of lateral scan lines having different angles, and step S20 of performing control so that different pieces of data are output at the angles represented by the respective lateral scan lines using the plurality of lateral scan lines.

In this case, the plurality of lateral scan lines may be present in adjacent pixels.

Furthermore, the adjacent pixels may be configured to have the same size. Furthermore, the angles represented by the upper and lower lateral scan lines of the plurality of lateral scan lines may be symmetrical with respect to a center lateral scan line in a vertical direction.

Figure 8:
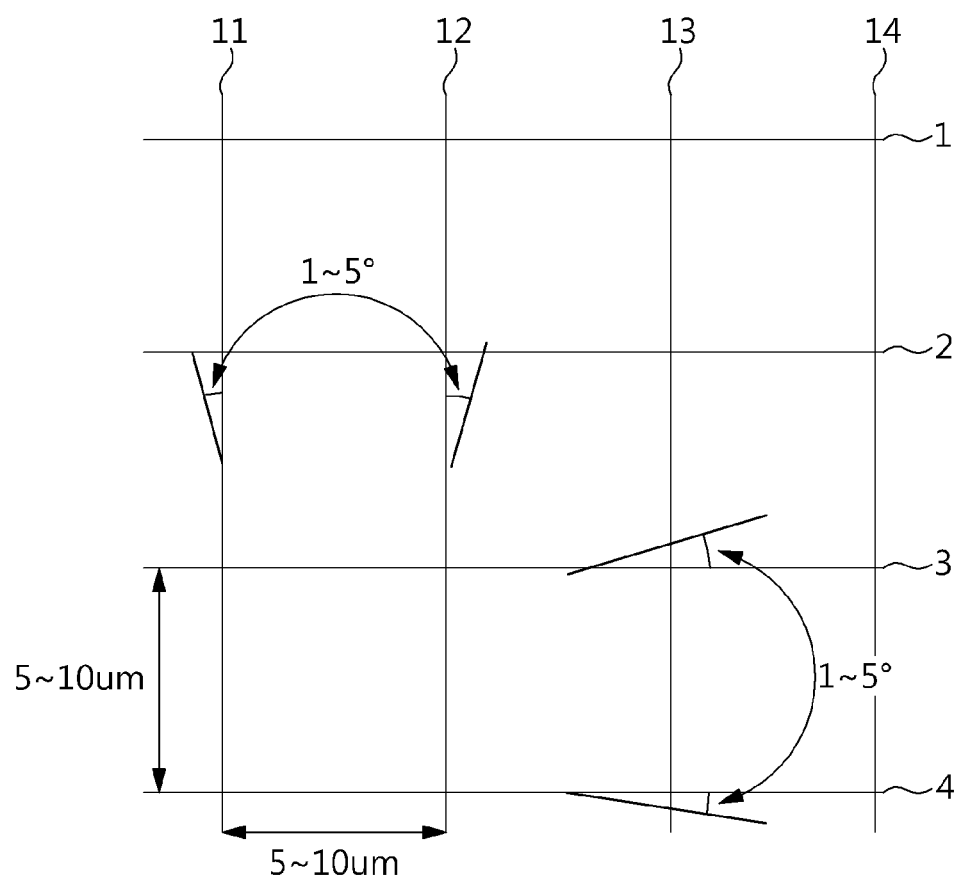
FIGS. 8 and 9 are diagrams illustrating embodiments of the wide viewing angle holographic image display method and apparatus according to the present invention.
Figure 9:
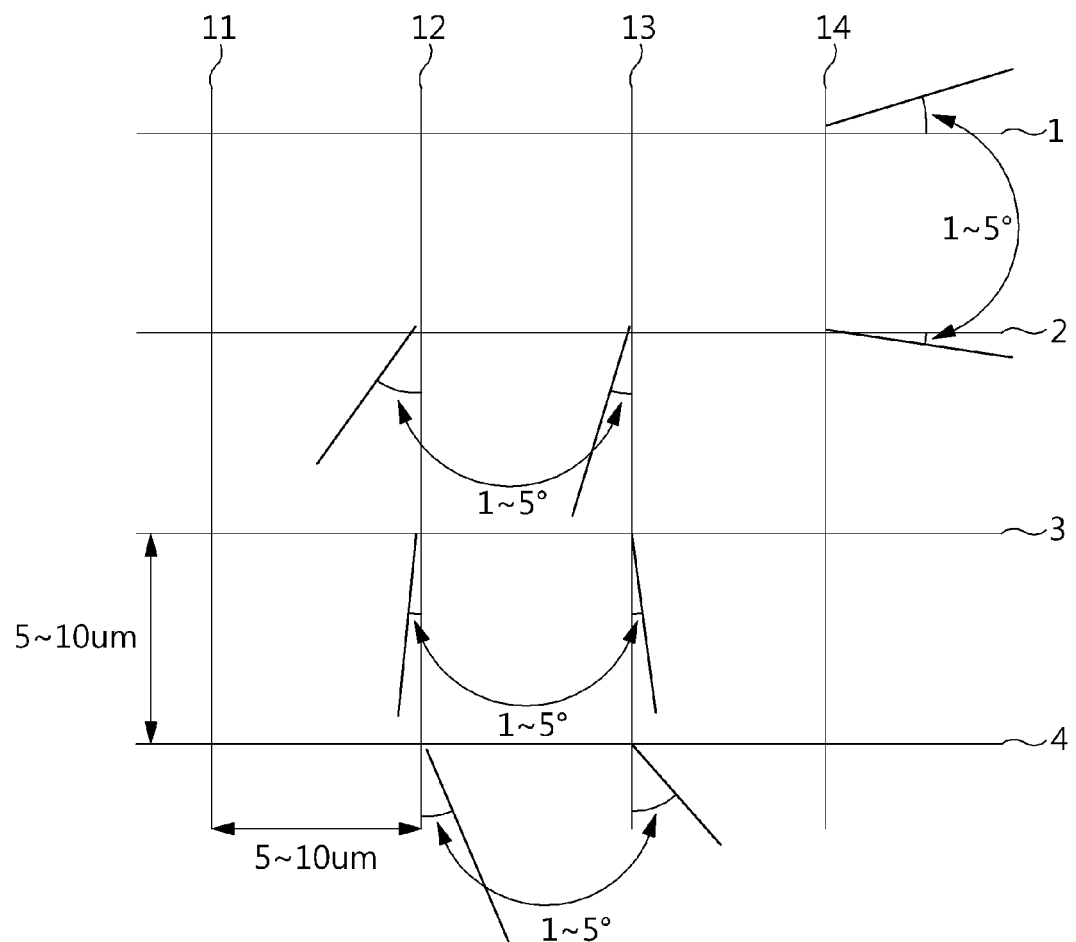

A specific embodiment of the wide viewing angle holographic image display method according to the present invention will now be described. FIGS. 8 and 9 are diagrams illustrating embodiments of the wide viewing angle holographic image display method and apparatus according to the present invention.

Referring to FIGS. 8 and 9, to practice the wide viewing angle holographic image display method according to this embodiment of the present invention, a spatial light modulator (SLM) is required. In this case, the pixels of the spatial light modulator include lateral scan lines 1, 2, 3 and 4 and vertical scan lines 11, 12, 13 and 14.

A spatial light modulator including pixels having a size in the range of 1 to 10 um, which can be implemented using current technology, as illustrated in FIG. 8, is used. The technical characteristic of the present invention is that it is possible to display a holographic image supporting a wide viewing angle, as illustrated in FIG. 8, based on a pixel size that can be implemented using the current technology.

In the case of FIG. 8, when a spatial light modulator having a pixel size in the range of 5 to 10 um is used, a holographic image may be displayed in the range of 1 to 5 degrees in lateral and vertical directions.

In the present invention, only lateral parallax is supported, so that resources used for support for vertical parallax are used to increase viewing angle in the vertical direction, thereby considerably increasing a viewing angle in the lateral direction without reducing the size of pixels.

For a more detailed discussion, referring to FIG. 9, the angles represented by the lateral scan lines 2, 3 and 4 are changed.

Accordingly, although each scan line provides only a viewing angle in the range of 1 to 5 degrees because of the limited size of pixels, a viewing angle of no larger than 15 degrees can be provided when data of different views are displayed using three scan lines 2, 3 and 4 together.

For example, when six scan lines are used in the above manner, a viewing angle of no larger than 30 degrees can be provided.

That is, data of different views provided by respective scan lines are integrated, and thus a wide viewing angle can be ensured.

Furthermore, a case where three lateral scan lines are selected at step S10 of selecting the lateral scan lines will be discussed below.

For example, in FIG. 8, if lateral scan lines 2, 3, and 4 are selected, it is preferred that lateral scan line 2, which is an upper lateral scan line, and lateral scan line 4, which is a lower lateral scan line, represent symmetrical angles with respect to lateral scan line 3, which is a center lateral scan line, in a vertical direction.

Figure 7:
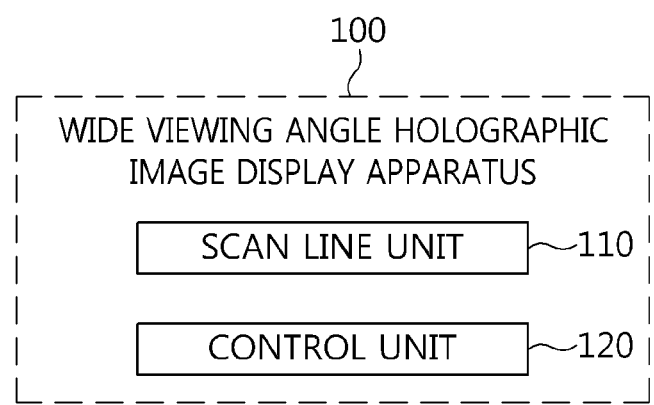
FIG. 7 is a block diagram of a wide viewing angle holographic image display apparatus according to an embodiment of the present invention.

A wide viewing angle holographic image display apparatus 100 according to an embodiment of the present invention will be described below. FIG. 7 is a block diagram of the wide viewing angle holographic image display apparatus 100 according to this embodiment of the present invention.

Referring to FIG. 7, the wide viewing angle holographic image display apparatus 100 according to this embodiment of the present invention includes a scan line unit 110 configured to include a plurality of lateral scan lines that represent different angles, and a control unit 120 configured to perform control so that different data are output at angles represented by the respective lateral scan lines using the plurality of lateral scan lines.

In this case, the plurality of lateral scan lines may be present in adjacent pixels.

Furthermore, the adjacent pixels may be configured to have the same size. Furthermore, the angles represented by the upper and lower lateral scan lines of the plurality of lateral scan lines may be symmetrical with respect to a center lateral scan line in a vertical direction.

A specific embodiment of the wide viewing angle holographic image display apparatus according to the present invention will be described below. FIGS. 8 and 9 are diagrams illustrating embodiments of the wide viewing angle holographic image display method and apparatus according to the present invention.

Referring to FIGS. 8 and 9, the pixels of the wide viewing angle holographic image display apparatus 100 according to this embodiment of the present invention includes lateral scan lines 1, 2, 3 and 4 and vertical scan lines 11, 12, 13 and 14.

As illustrated in FIG. 8, it is possible to fabricate pixels having a size in the range of 1 to 10 um using current technology. The technical characteristic of the present invention is that it is possible to display a holographic image supporting a wide viewing angle, as illustrated in FIG. 8, based on a pixel size that can be implemented using the current technology, as described above.

In the case of FIG. 8, when the wide viewing angle holographic image display apparatus 100 having a pixel size in the range of 5 to 10 um is used, a holographic image may be displayed in the range of 1 to 5 degrees in lateral and vertical directions.

In the present invention, only lateral parallax is supported, so that resources used for support for vertical parallax are used to increase viewing angle in the vertical direction, thereby considerably increasing a viewing angle in the lateral direction without reducing the size of pixels.

For a more detailed discussion, referring to FIG. 9, the angles represented by the lateral scan lines 2, 3 and 4 are changed.

Accordingly, although each scan line provides only a viewing angle in the range of 1 to 5 degrees because of the limited size of pixels, a viewing angle of no larger than 15 degrees can be provided when data of different views are displayed using three scan lines 2, 3 and 4 together.

For example, when six scan lines are used in the above manner, a viewing angle of no larger than 30 degrees can be provided.

That is, data of different views provided by respective scan lines are integrated, and thus a wide viewing angle can be ensured.

Furthermore, a case where three lateral scan lines are selected by the scan line unit 110 will be described below.

For example, in FIG. 8, if lateral scan lines 2, 3, and 4 are selected, it is preferred that lateral scan line 2, which is an upper lateral scan line, and lateral scan line 4, which is a lower lateral scan line, represent symmetrical angles with respect to lateral scan line 3, which is a center lateral scan line, in a vertical direction.

In summary, to implement digital holographic image display, a spatial light modulator having a small pixel size that cannot be implemented even using the highest level microprocess is required. However, the wide viewing angle holographic image display method and apparatus according to embodiments of the present invention can display large screen wide viewing angle digital holographic images using a spatial light modulator that has been already commercialized using current technology or can be fabricated with a slight additional effort.

The wide viewing angle holographic image display method and apparatus according to embodiments of the present invention have the advantage of being capable of displaying wide viewing angle holographic images without reducing the size of pixels.

Furthermore, the wide viewing angle holographic image display method and apparatus according to embodiments of the present invention have the advantage of being capable of dividing a space in a lateral direction of pixels and then supporting a wide viewing angle.

Moreover, the wide viewing angle holographic image display method and apparatus according to embodiments of the present invention have the advantage of being capable of performing control so that holographic images having different angles are displayed along the respective lateral scan lines of pixels.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A wide viewing angle holographic image display method, comprising:
    selecting a plurality of lateral scan lines that represent different angles, respectively; and
    performing control so that different data are output at the respective different angles, represented by the lateral scan lines, using the plurality of lateral scan lines.

2. The wide viewing angle holographic image display method of claim 1, wherein the plurality of lateral scan lines are present in adjacent pixels.

3. The wide viewing angle holographic image display method of claim 2, wherein the adjacent pixels are configured to have a same size.

4. The wide viewing angle holographic image display method of claim 1, wherein selecting the lateral scan lines comprises selecting an odd number of lateral scan lines.

5. The wide viewing angle holographic image display method of claim 1, wherein upper and lower lateral scan lines of the plurality of lateral scan lines represent symmetrical angels with respect to a center lateral scan line in a vertical direction.

6. A wide viewing angle holographic image display apparatus, comprising:
    a scan line unit configured to include a plurality of lateral scan lines that represent different angles, respectively; and
    a control unit configured to perform control so that different data are output at the respective different angles, represented by the lateral scan lines, using the plurality of lateral scan lines.

7. The wide viewing angle holographic image display apparatus of claim 6, wherein the plurality of lateral scan lines are present in adjacent pixels.

8. The wide viewing angle holographic image display apparatus of claim 7, wherein the adjacent pixels are configured to have a same size.

9. The wide viewing angle holographic image display apparatus of claim 6, wherein selecting the lateral scan lines comprises selecting an odd number of lateral scan lines.

10. The wide viewing angle holographic image display apparatus of claim 6, wherein upper and lower lateral scan lines of the plurality of lateral scan lines represent symmetrical angels with respect to a center lateral scan line in a vertical direction.

* * * * *